May 21, 1935.  E. H. HANSEN  2,002,111

SYSTEM FOR SYNCHRONIZING SOUND WITH MOTION PICTURES

Filed Aug. 25, 1933

Inventor

E. H. Hansen

Patented May 21, 1935

2,002,111

UNITED STATES PATENT OFFICE 2,002,111

SYSTEM FOR SYNCHRONIZING SOUND WITH MOTION PICTURES

Edmund H. Hansen, Los Angeles, Calif.

Application August 25, 1933, Serial No. 686,794

3 Claims. (Cl. 88—16.2)

This invention relates to the art of sound pictures and deals particularly with a system for synchronizing sound records with motion pictures.

The purpose of the hereinafter described invention is to provide a simple inexpensive device whereby the small camera or projector now finding use in the home and elsewhere may be utilized to record and reproduce actual sound pictures.

Briefly stated, the invention comprises means whereby a motion picture camera or a projector may be driven directly by the same means that rotates the sound record on a phonograph.

In its preferred form the invention may embody a member adapted to be coupled to and driven by the centering pin of a disk record on a phonograph. The member in this form may carry two units, one a feed screw for controlling the travel of the sound head and the other a flexible connection for driving a camera or a projector. The member with these two units may be used for either recording sound in conjunction with a motion picture camera or for reproducing sound in synchronization with a projector.

In another form which may be used for synchronizing sound records with motion pictures for reproduction purposes, the invention may embody only a flexible drive connection for driving a projector.

With my device, the sound may be recorded during the taking of the pictures or it may be extraneous sound coupled with the pictures after taking. In either case the sound is perfectly synchronized with the pictures due to the fact that the camera or projector is driven by the same mechanism that drives the sound record.

Accordingly it becomes an object of this invention to provide means whereby a phonograph record may be synchronized with motion pictures.

Another object is to provide means for driving either a camera or a projector through the record centering pin on a phonograph.

A further object is to provide means whereby the rotation of the sound record on a phonograph controls the rotation of a camera or a projector and also the travel of the sound head over a sound record.

Other objects and advantages will become apparent as the description proceeds in conjunction with the drawing in which.

Figure 1:
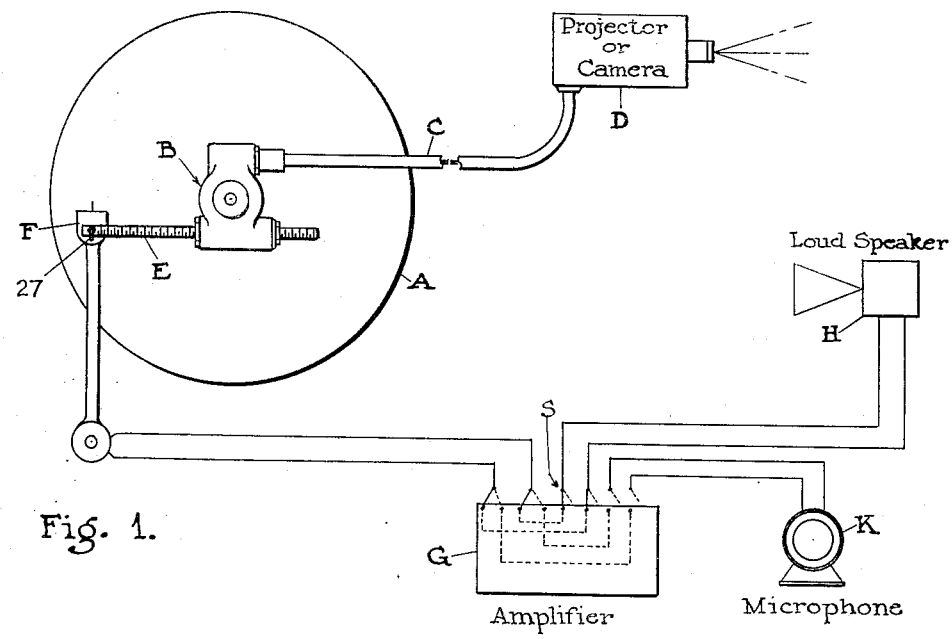
Figure 1 is a schematic diagram showing the manner in which my invention may be applied to a phonograph.

By referring to the drawing and particularly to Figure 1 it will be seen that I have shown my invention in combination with a disk sound record. In this view, A designates the sound record, B the member mentioned hereinbefore which is adapted to fit over the record centering pin, C a flexible drive connection for driving a camera or projector D, E a feed screw for controlling the travel of the phonographic sound head F over the record A, G an amplifier, H a loud speaker and K a microphone, all of which will be more fully described hereinafter.

Figure 2:
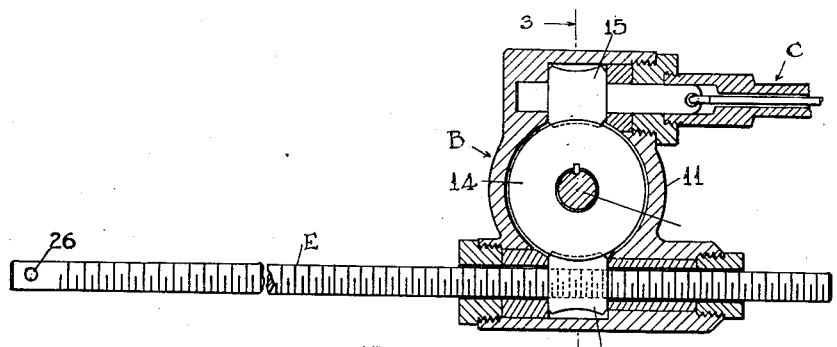
Figure 2 is a transverse section of the member adapted to be attached to the centering pin on the phonograph, (taken on line 2—2 of Figure 3)
Figure 3:
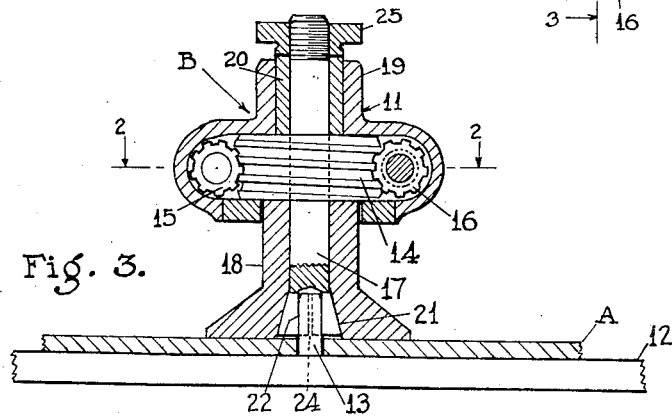
Figure 3 is a vertical section of the same, taken on line 3—3 of Figure 2.

In Figures 2 and 3, the structure of the member B is fully shown and is seen to comprise a casing 11 which houses the parts of the device. The member B is adapted to sit upon the record A and the record in turn is supported upon a phonograph turn table 12 (fragmentarily shown). The turn table 12 carries the usual record centering pin, designated 13, which as is commonly known rotates with the table and the record.

Rotatably mounted within the casing 11 is a horizontal gear 14 which meshes with gears 15 and 16 on opposite sides thereof. The gear 14 is adapted to be driven by the record centering pin 13 and it is to be understood that whereas the gear 14 rotates, the housing 11 remains stationary. For this purpose, the gear 14 is attached to a pin 17 in any suitable manner and the pin 17 is adapted to be detachably mounted on the record centering pin 13. The pin 17 is rotatably mounted in the housing 11. In order to give stability to the device and provide a detachable mounting, a base member 18 is placed between the gear 14 and the record A. The member 18 also rotates with the record and the gear. The pin 17 extends upwardly through the casing 11 and slightly above a hub 19 on the casing. A sleeve 20 is installed around the pin 17 above the gear 14 and within the hub 19. This pin is arranged to rotate within the hub 19 and will be seen to extend slightly above the upper end of the hub and at the lower end to bear against the upper surface of the gear 14. Means is provided for detachably mounting the pin 17 on the record centering pin 13 of the phonograph. For this purpose the base member 18 is provided with a flared opening 21 and the lower end of the pin 17 is shaped to fit the opening (see Figure 3). The lower end of the pin 17 is also bored to form a hole 22 which is adapted to receive the record centering pin 13. The flared wall of the lower end of the pin 17 is then slotted, as indicated by the numeral 24. With such an arrangement, it is evident that as the pin 17 is pulled upwardly into the flared opening 21, the expanding end of the pin 17 will compress about the pin 13 and form a solid driving connection between the two pins and as has been shown this will drive the gear 14. The pin 17 is pulled upwardly by means of a screw threaded nut 25 mounted on the upper end of the pin, said nut bearing against the sleeve 20 and the gear 14 being splined on the pin 17 to permit slight movement of the pin through the gear.

As the gear 14 rotates with the pin 13 and consequently the record A, it drives the gears 15 and 16 which are meshed with it on opposite sides. The details of mounting the gears 15 and 16 are unimportant, it being thought sufficient to state that they are rotatably mounted in the casing 11 and are adapted to be driven by the gear 14. The gear 15 is suitably connected to the flexible drive connection C and may be used to drive either a camera or a projector D. The gear 16 is a hollow gear and is internally screw threaded to receive the feed screw E. It is thus obvious, that if the feed screw E is held against rotation as the gear 16 rotates in response to rotation of the gear 14, the feed screw will be fed longitudinally through the gear 16. In order to prevent rotation of the feed screw with the gear 16, the outer end is provided with a small hole 26 adapted to receive a small pin 27 on the sound head F of the phonograph. This pin also serves as a means of attaching the feed screw to the sound head whereby the sound head is caused to travel uniformly across the face of the disk A as the feed travels through the gear 16. The feed screw arrangement will find usefulness in recording on blank disks, that is, on disks that are not pre-grooved.

For recording sound with motion pictures, the device B would be mounted upon a blank disk record substantially as shown in Figure 1 and would be connected to the record centering pin 13 in the manner hereinbefore described. The microphone K would be connected to the amplifier G by means of a switching arrangement generally designated S which is diagrammatically shown for the purpose described, and a camera would be connected to the flexible drive connection C. As soon as the phonograph starts rotating the disk A, the camera starts operating and sound may be synchronously recorded with the pictures.

For the reproduction of sound with the pictures, a projector would be substituted for the camera and a loud speaker would be substituted for the microphone by means of the switching arrangement S. Then by synchronizing the start of the film with the start of the record, by any suitable means such as indicia on the film and record, a perfect synchronization of sound with the pictures may be had. It is to be understood that for reproduction, the feed screw E is not necessary and may be dispensed with. Accordingly, the device for reproduction purposes only will find usefulness with the flexible connection only.

Although I have shown and described my invention embodied in a single form, nevertheless, I do not wish to restrict the invention to this form. I, therefore, reserve the rights to such modifications and refinements as come within the scope of the disclosure and the purview of the appended claims.

I claim:

1. For use with a phonograph having a rotatable record centering pin; a device having a rotatable gear therein; means for detachably connecting said gear to said pin; a pair of gears in mesh with said gear, one of said gears being adapted to drive a flexible drive connection and the other of said gears being hollow and internally screw threaded for receiving a threaded rod and means for connecting one end of said rod to a phonograph sound head.

2. For use with a phonograph having a rotatable record centering pin; a device having a rotatable gear therein; means for detachably connecting said gear to said pin; a pair of gears in mesh with said gear, one of said gears being adapted to drive a flexible drive connection and the other of said gears being internally screw threaded for receiving a screw threaded rod, said rod having a hole in one end for receiving a pin on the phonograph sound head.

3. For use with a phonograph having a rotatable record centering pin, a unitary device adapted to be detachably mounted upon said pin, said device having members actuated by said pin for synchronously driving a motion picture camera and controlling the travel of the sound head of the phonograph.

EDMUND H. HANSEN.